United States Patent
Claesson et al.

(10) Patent No.: US 11,592,834 B2
(45) Date of Patent: Feb. 28, 2023

(54) METHOD FOR REPLACING A MODULE OF A VEHICLE, A CONTROL DEVICE, A VEHICLE, A SYSTEM, A COMPUTER PROGRAM AND A COMPUTER-READABLE MEDIUM

(71) Applicant: Scania CV AB, Södertälje (SE)

(72) Inventors: André Claesson, Tullinge (SE); Robert Sjödin, Nyköping (SE); Linus Ährlig, Västerhaninge (SE); Sami Teppola, Nykvarn (SE); Mikko Kallio, Hölö (SE); Tomas Skeppström, Södertälje (SE); Morgan Colling, Hölö (SE)

(73) Assignee: Scania CV AB, Södertälje (SE)

( * ) Notice: Subject to any disclaimer, the term of this patent is extended or adjusted under 35 U.S.C. 154(b) by 14 days.

(21) Appl. No.: 17/051,193

(22) PCT Filed: Apr. 29, 2019

(86) PCT No.: PCT/SE2019/050382
§ 371 (c)(1),
(2) Date: Oct. 28, 2020

(87) PCT Pub. No.: WO2019/231372
PCT Pub. Date: Dec. 5, 2019

(65) Prior Publication Data
US 2021/0240200 A1    Aug. 5, 2021

(30) Foreign Application Priority Data
May 28, 2018   (SE) .................................. 1850635-2

(51) Int. Cl.
*G05D 1/02*   (2020.01)
*B62D 63/02*   (2006.01)
(Continued)

(52) U.S. Cl.
CPC .......... *G05D 1/0287* (2013.01); *B62D 63/025* (2013.01); *G05D 1/12* (2013.01); *B25J 9/08* (2013.01); *B60P 3/42* (2013.01)

(58) Field of Classification Search
CPC ...... G05D 1/0287; G05D 1/12; B62D 63/025; B25J 9/08; B60P 3/42
See application file for complete search history.

(56) References Cited

U.S. PATENT DOCUMENTS

| 4,897,642 A * | 1/1990 | DiLullo ................ G01S 5/0009 |
| | | 701/1 |
| 6,314,447 B1 * | 11/2001 | Lea ........................ G06F 9/5044 |
| | | 709/201 |

(Continued)

FOREIGN PATENT DOCUMENTS

| DE | 102014015698 A1 | 4/2016 |
| DE | 10 2016 209 099 A1 | 7/2017 |

(Continued)

OTHER PUBLICATIONS

Novelty Search Report dated Feb. 1, 2018.
(Continued)

*Primary Examiner* — Hunter B Lonsberry
*Assistant Examiner* — Harrison Heflin
(74) *Attorney, Agent, or Firm* — Banner & Witcoff, Ltd.

(57) ABSTRACT

A method for replacing a first module (30, 40) of a vehicle (1) with a new module (30, 30', 40). The vehicle (1) includes: at least one drive module (30); and at least one functional module (40). The vehicle (1) has a unique vehicle identity. The method includes: setting (s101) the vehicle (1) into a maintenance mode indicating that the vehicle (1) is not available for operation; and preparing (s102) the vehicle (1) for physical disconnection of the first module (30, 40); when the first module (30, 40) has been physically disconnected from the vehicle (1) and the new module (30, 30', 40) has (Continued)

been physically connected to the vehicle (1): establishing (s103) an electrical connection between the new module (30, 30', 40) and the vehicle (1); assigning (s104) the new module (30, 30', 40) the unique vehicle identity of the vehicle (1); setting (s105) the vehicle (1) into an operational mode; and verifying s106) the electrical connection of the new module (30, 30', 40).

25 Claims, 4 Drawing Sheets

(51) Int. Cl.
*G05D 1/12* (2006.01)
*B60P 3/42* (2006.01)
*B25J 9/08* (2006.01)

(56) References Cited

U.S. PATENT DOCUMENTS

| | | | |
|---|---|---|---|
| 9,802,661 B1 | 10/2017 | Kentley-Klay | |
| 10,545,509 B1* | 1/2020 | Jessen | B62D 24/00 |
| 2002/0022979 A1* | 2/2002 | Whipp | G07F 17/0042 705/5 |
| 2003/0040933 A1 | 2/2003 | Chernoff et al. | 705/1 |
| 2003/0158638 A1 | 8/2003 | Yakes et al. | 701/22 |
| 2004/0084920 A1* | 5/2004 | Trimble | B60R 11/02 296/37.8 |
| 2014/0262583 A1 | 9/2014 | Uri | 180/233 |
| 2014/0358353 A1 | 12/2014 | Ibanez-Guzman et al. | |
| 2015/0202974 A1* | 7/2015 | Rub | B60L 53/65 320/109 |
| 2016/0129958 A1 | 5/2016 | Byrnes et al. | |
| 2017/0197678 A1 | 7/2017 | Scaringe | |
| 2018/0039285 A1 | 2/2018 | Giegel | |
| 2018/0050626 A1 | 2/2018 | Delp et al. | |
| 2018/0345971 A1* | 12/2018 | Birnschein | B60R 16/0231 |

FOREIGN PATENT DOCUMENTS

| | | |
|---|---|---|
| DE | 10 2018 002 229 A1 | 8/2018 |
| DE | 10 2017 216 207 A1 | 10/2018 |
| WO | WO 2014/007729 A1 | 1/2014 |
| WO | 2018222375 A1 | 12/2018 |
| WO | WO 2018/222375 A1 | 12/2018 |
| WO | 2019194720 A1 | 10/2019 |

OTHER PUBLICATIONS

Office Action dated Oct. 30, 2018 in corresponding Swedish Patent Application No. 1850635-2.
International Search Report dated Jul. 3, 2019 in corresponding PCT International Application No. PCT/SE2019/050382.
Written Opinion dated Jul. 3, 2019 in corresponding PCT International Application No. PCT/SE2019/050382.
Feb. 9, 2022—(EP) Extended Search Report—App. No. 19811355.7.

* cited by examiner

METHOD FOR REPLACING A MODULE OF A VEHICLE, A CONTROL DEVICE, A VEHICLE, A SYSTEM, A COMPUTER PROGRAM AND A COMPUTER-READABLE MEDIUM

CROSS-REFERENCE TO RELATED APPLICATIONS

The present application is a 35 U.S.C. §§ 371 national phase conversion of PCT/SE2019/050382, filed Apr. 29, 2019, the contents of which are incorporated herein by reference which claims priority of Swedish Patent Application No. 1850635-2, filed May 28, 2018, the contents of which are incorporated by reference herein. The PCT International Application was published in the English language.

TECHNICAL FIELD

The present invention relates to a method for replacing a module of a vehicle assembled from a set of modules. More specifically the present invention relates to a method for replacing a first module of a vehicle with a new module. The present invention also relates to a control device, a vehicle, a system, a computer program and a computer-readable medium.

BACKGROUND

Vehicles of today are typically manufactured for a specific purpose, e.g. a bus is manufactured for transporting people and a truck is manufactured for transporting goods, Such vehicles are typically manufactured and completely assembled in a factory or they may be partly assembled in a factory and completed at a body manufacturer. Once the vehicle is assembled, the vehicle will only be used for the specific purpose. Thus, a bus will only be used as a bus and a garbage truck will only be used as a garbage truck. Different vehicles are thus needed for different purposes, which may require a large fleet of vehicles and which may be very costly. A more flexible vehicle, which enables customization, may therefore be desired.

There are, for example, known solutions where a truck can be rebuilt by changing a concrete mixer to a loading platform. This increases the flexibility and two different functions can be achieved by means of one single vehicle. Document US-2016/0129958 A discloses a modular electric vehicle using interchangeable vehicle assembly modules. The user can thereby disassemble and reassemble the vehicle for use in different applications.

In the event that a module of such a modular vehicle for example starts to malfunction, the vehicle may be operated to a workshop, in order to repair the module. Alternatively, the failing module may be replaced with a new functional module. Replacing a module may be a very cumbersome and time-consuming procedure, which affect the utility of the vehicle.

SUMMARY

Despite known solutions in the field, it would be desirable to achieve a way of replacing a module of a vehicle with a new module, which solves or at least alleviates at least some of the drawbacks of the prior art.

An object of the present invention is therefore to achieve a new and advantageous method for replacing a module of a vehicle assembled from a set of modules with a new module, which method is easier and less time consuming than prior art solutions. Another object of the invention is to achieve a new and advantageous control device, vehicle, system, computer program and computer-readable medium for replacing a module with a new module in an easier and less time-consuming way.

The herein mentioned objects are achieved by a method for replacing a first module of a vehicle with a new module, a control device, a vehicle, a system, a computer program and a computer-readable medium according to the independent claims.

Hence, according to an aspect of the present invention a method, performed by a control device of a vehicle assembled from a set of modules, for replacing a first module of the vehicle with a new module from the set of modules is provided. The vehicle comprises: at least one drive module; and at least one functional module, wherein the at least one drive module comprises a pair of wheels and is configured to be autonomously operated and drive the assembled vehicle. The vehicle further comprises a unique vehicle identity. The method comprises: setting the vehicle into a maintenance mode indicating that the vehicle is not available for operation; and preparing the vehicle for physical disconnection of the first module. The method further comprises, when the first module has been physically disconnected from the vehicle and the new module has been physically connected to the vehicle: establishing an electrical connection between the new module and the vehicle; assigning the new module the unique vehicle identity of the vehicle; setting the vehicle into an operational mode; and verifying the electrical connection of the new module.

According to another aspect of the invention a control device of a vehicle assembled from a set of modules is provided, the control device being configured for replacing a first module of the vehicle with a new module from the set of modules. The vehicle comprises: at least one drive module; and at least one functional module, wherein the at least one drive module comprises a pair of wheels and is configured to be autonomously operated and drive the assembled vehicle, wherein the vehicle further comprises a unique vehicle identity. The control device is configured to: set the vehicle into a maintenance mode indicating that the vehicle is not available for operation; and prepare the vehicle for physical disconnection of the first module. The control device is further configured to, when the first module has been physically disconnected from the vehicle and the new module has been physically connected to the vehicle: establish an electrical connection between the new module and the vehicle; assigning the new module the unique vehicle identity of the vehicle; set the vehicle into an operational mode; and verify the electrical connection of the new module.

According to yet another aspect of the invention a vehicle assembled from a set of modules is provided. The vehicle comprises at least one drive module and at least one functional module. The vehicle further comprises a control device as disclosed herein.

According to an aspect of the invention, a system, configured for replacing a module of a vehicle assembled from a set of modules with a new module from the set of modules is provided, the vehicle comprising at least one drive module and at least one functional module, wherein the at least one drive module comprises a pair of wheels and is configured to be autonomously operated and drive the assembled vehicle. The system comprises: a control center arranged in communication with the vehicle. The system further comprises a control device as disclosed herein.

Assembling a vehicle from a set of modules makes it possible to dynamically assemble a modularized vehicle depending on a current mission or function to be performed. In this way, from the same set of modules, for example a truck, a garbage truck, a bus or a snowplough can be assembled. Not only will this result in an increased flexibility, but the cost for a vehicle owner will decrease significantly compared to having a plurality of different vehicles for different applications. By using at least one autonomously operated drive module, the drive module may autonomously/automatically perform physical connection and electrical connection with a second module. In this way, no manual work is required and the assembly of the vehicle is less cumbersome and much more time efficient. When a first module of the modularized vehicle is malfunctioning, needs service or when charging of an energy storage unit of the first module is required, the first module may be replaced with a new module. In the event that it has been identified that the first module of the vehicle for example needs to be repaired, the vehicle may be operated to a work shop, service station or similar where the first module can be replaced. Alternatively, the vehicle is operated to a safe place along the roadside where the first module can be replaced. No matter where the vehicle stops to replace the first module, the new module may be autonomously operated to the location of the vehicle, or the new module may be transported to the location of the vehicle by means of another vehicle. The first module may be referred to as a faulty module, meaning that there is something causing the replacement of the first module. Thus, faulty does not have to mean that the first module is malfunctioning. By means of the disclosed method, the module can be replaced in an easier and more efficient way than previously known. The method is performed by a control device of the vehicle, which means that the manual work is reduced. By setting the vehicle into a maintenance mode, the vehicle and any operator is informed that the vehicle is not available for operation. The vehicle is subsequently prepared for physical disconnection of the first module, where after the first module is physically disconnected and replaced with the new module. The new module is suitably of similar type as the first module. When the new module has been physically connected to the remaining modules of the vehicle, an electrical connection is established between the new module and the vehicle. In this way, communication and/or power transfer between the new module and the other modules of the vehicle is enabled. By assigning the new module the unique vehicle identity, the new module is linked/connected to the vehicle in which it is now comprised. The new module is thereby no longer available for assembly of another vehicle. Finally, the vehicle is set into an operational mode such that it can continue its mission/task and the electrical connection of the new module is verified. By verifying the electrical connection of the new module, it can be ensured that the electrical connection has been correctly performed and that the correct module has been electrically connected before operating the vehicle. In this way, safety is increased.

Further objects, advantages and novel features of the present invention will become apparent to one skilled in the art from the following details, and also by putting the invention into practice. Whereas examples of the invention are described below, it should be noted that it is not restricted to the specific details described. Specialists having access to the teachings herein will recognise further applications, modifications and incorporations within other fields, which are within the scope of the invention.

During operation of a vehicle assembled from a set of modules, also called a modularized vehicle, situations may occur where one or more modules needs to be repaired, charged or just undergo service. The fact that the vehicle is modular enables replacement of the module in need of repair/service/charging instead of taking the whole vehicle off the road until the module is ready to be used again. The vehicle off road (VOR) time is thereby reduced which is a big advantage compared to regular vehicles. However, even though replacement of a module may result in better use of the vehicle, the replacement procedure may be cumbersome and time consuming. To facilitate such replacement and to ensure safety, a method for replacing a first module of a vehicle with a new module has been developed. The present disclosure is applicable on all sorts of road vehicles. However, the disclosure may relate to heavy vehicles, such as buses, trucks etc. Specifically, the present disclosure may relate to vehicles for use on public roads.

According to an aspect of the present disclosure, a method, performed by a control device of a vehicle assembled from a set of modules, for replacing a first module of the vehicle with a new module from the set of modules is provided. The vehicle comprises: at least one drive module; and at least one functional module, wherein the at least one drive module comprises a pair of wheels and is configured to be autonomously operated and drive the assembled vehicle. The vehicle further comprises a unique vehicle identity. The method comprises: setting the vehicle into a maintenance mode indicating that the vehicle is not available for operation; and preparing the vehicle for physical disconnection of the first module. The method further comprises, when the first module has been physically disconnected from the vehicle and the new module has been physically connected to the vehicle: establishing an electrical connection between the new module and the vehicle; assigning the new module the unique vehicle identity of the vehicle; setting the vehicle into an operational mode; and verifying the electrical connection of the new module. Thus, the method comprises: setting the vehicle into a maintenance mode indicating that the vehicle is not available for operation; preparing the vehicle for physical disconnection of the first module; establishing an electrical connection between the new module and the vehicle, the new module having replaced the first module and being physically connected to the vehicle; assigning the new module the unique vehicle identity of the vehicle; setting the vehicle into an operational mode; and verifying the electrical connection of the new module.

The set of modules from which the vehicle is assembled may comprise a plurality of drive modules and a plurality of functional modules. The first module may thus be a drive module or a functional module. The new module is of similar type as the first module. Thus, if the first module is a drive module, the new module is also a drive module. The different drive modules of the set of modules may be identical or the drive modules may for example have different types/sizes of wheels, different suspension, different power capacity and/or different charge capacity. In one example, each drive module comprises a body provided with a pair of wheels arranged on two opposite sides of the drive module. In an example, the drive module has only one pair of wheels. Each drive module comprises at least one propulsion unit connected to the pair of wheels. The propulsion unit may be an electric machine, connected to the wheels. The pair of wheels of the drive module may thus be referred to as drive wheels. In one example, the drive module(s) comprises two electrical machines, one connected to each wheel. The electric machines may be arranged in the rim of the wheels. The wheels of the drive module can thus be driven independently of each other. The electric machines may also work as generators and generate electric power when braking the wheels. The drive module may also comprise a steering system connected to the wheels. In this way, the drive module is steerable. The drive module may also comprise a brake system for braking the wheels. Suitably, the brake system comprises a wheel brake for each wheel of the drive module. Redundancy is achieved in that the drive module can be steered by means of the electrical machines and/or the wheel brakes in the event that the steering system malfunctions. In one example, the drive module further comprises at least one energy storage unit for providing the propulsion unit with energy. The energy storage unit may be an electric battery. The electric battery may be rechargeable. The drive module being configured to be autonomously operated means that the drive module comprises a plurality of sensors and systems for steering and driving the drive module automatically as an independent unit according to conventional methods. According to an example, the drive module comprises a navigation system and sensors for detecting objects in the surrounding of the drive module. The drive module may be referred to as an autonomously operated vehicle in the sense that it is allowed to operate on public roads.

Each functional module of the set of modules is configured to perform a predetermined function while being part of an assembled vehicle. In one example, the functional module is configured to accommodate or support a load. The functional module may be configured for accommodating passengers and may thus form a bus when being assembled with at least one drive module. The functional module may alternatively be configured for transporting goods and may thus form a truck when being assembled with at least one drive module. The functional module may be any of a garbage truck body, a loading platform, a fork arrangement for a forklift, and a snowplough. The functional module may comprise trailing wheels, which are not driven or steerable. A functional module cannot move on its own but needs to be connected to at least one drive module to be able to move, the functional module and the drive module thereby together forming a vehicle. The functional module may comprise an energy storage unit, such as a battery.

The first module may be physically connected to another module of the vehicle through corresponding physical interfaces. Such physical interfaces may be configured in different ways, and may for example comprise coupling units adapted to engage, quick couplings, hooks, cooperating protrusions and recesses or similar. It is to be understood that the configuration of the physical interface is not part of the invention per se. The first module may comprise a physical interface for connection with another module on at least two different sides of the first module. In this way, the first module can be connected to another module in various ways and the flexibility is increased. In the event that the first module is a drive module, the first module may comprise a physical interface both on a front side of the first module and on a rear side of the first module. The first module can thereby be connected to a front section of a functional module and to a rear section of a functional module, without having to turn the first module. Additionally or alternatively, the first module being a drive module may comprise a physical interface on a top side of the first module. The different physical interfaces for connection with another module may be identical on all sides of the first module. By using a standard interface, which can be used for connection with another drive module as well as a functional module, the flexibility of the first module increases and the assembly of a vehicle are facilitated. The physical connection may be autonomously performed when the first module and/or the new module is an autonomously operated drive module.

It is to be understood that the control device performing the disclosed method may be implemented as a separate entity or distributed in two or more physical entities. The control device may comprise one or more control units and/or computers. According to one example, the first module and the new module both comprises a control unit. Each module of the vehicle may comprise a control unit. The control device, as further described below, may thus comprise control units of each module of the vehicle, including a control unit of the new module. Alternatively, the control device is comprised in a module of the vehicle operating as a master. This will be further described below. The control device may thus be implemented or realized by the control device comprising a processor and a memory, the memory comprising instructions, which when executed by the processor, causes the control device to perform the herein disclosed method steps.

According to an example, the vehicle is set into the maintenance mode based on a received command from a control center arranged in communication with the vehicle. The control device is arranged in communication with the control center. The control center may be referred to as an off-board system. The control center may be geographically on a distance from the vehicle and the new module. Suitably, all modules of the vehicle are configured to communicate with the control center. The control center may be implemented as a separate entity or distributed in two or more physical entities. The control center may comprise one or more computers. The control center may be adapted to receive information about missions or functions to be performed and based on this mission/function initiate assembly/disassembly of a vehicle. The control center may also be adapted to assign the assembled vehicles different missions. Furthermore, the control center may be configured to determine when a module, for some reason, should be replaced with a new similar module. The control center may transmit a command to the control device of the vehicle, to initiate replacement of a first module. The control device may thereby receive a command from the control center to replace a certain module and thus to set the vehicle into a maintenance mode.

Alternatively, the control device identifies that the first module should be replaced with a new module and thereafter sets the vehicle into a maintenance mode. The method may thus comprise, before setting the vehicle into a maintenance mode, identifying that a first module should be replaced with a new module. The control device may identify that a module should be replaced based on information relating to the operation and general status of the modules.

According to another example, the vehicle is set into the maintenance mode based on a command from an operator, received via an operator interface on the vehicle or via a smart device. As an example, the vehicle may be in a workshop due to a faulty module or a faulty module may be identified during service. The mechanic/operator may then trigger replacement of the faulty module by means of commanding the vehicle to perform the replacement. The control device of the vehicle then performs the method as disclosed herein on its own. In this way, manual work is reduced. The mechanic may transmit this command to the control device by means of pushing a button on the vehicle, via a display in the vehicle, via a computer or via a smart device external of the vehicle, such as a smartphone, tablet, smartwatch, smart band, smart key chain or similar.

The physical disconnection of the first module from the vehicle may be performed manually by an operator, mechanic or similar. Similarly, the physical connection of the new module may be performed manually by an operator, mechanic or similar. Alternatively, the physical disconnection of the first module and/or the physical connection of the new module are performed autonomously. The vehicle may comprise an emergency coupling for manual use in the event that automatic connection/disconnection malfunctions. By means of the emergency coupling, the modules can be physically connected/disconnected manually in an easy way. The emergency coupling may also electrically connect/disconnect the modules.

Setting the vehicle into a maintenance mode may involve setting all modules of the vehicle into a maintenance mode. Alternatively, setting the vehicle into a maintenance mode involves setting one or more modules of the vehicle into a maintenance mode. Setting the vehicle into a maintenance mode may comprise changing the status of a vehicle mode, saved on a predetermined location in the memory of the control device, to maintenance mode. Setting the vehicle into a maintenance mode may comprise changing the status of a vehicle mode, saved on a predetermined location in a memory of each control unit of each module of the vehicle, to maintenance mode. Before assigning an assembled vehicle a mission, the control center may request a vehicle mode status from the assembled vehicle. The vehicle mode may be requested from all modules of the vehicle or the vehicle mode may be requested from the module operating as master. In the event that the vehicle mode is set to maintenance mode, the control center is informed that the vehicle is not ready for operation and the vehicle will therefore not be assigned any mission. In addition, if the vehicle is set to maintenance mode due to replacement of a module during an ongoing mission as disclosed herein, the change of vehicle mode status may trigger the control device to recalculate or change the planned vehicle route to fulfil the mission. The control center may also consider giving the mission to another operational vehicle, depending on the mission. Similarly, setting the vehicle into an operational mode may comprise changing the status of the vehicle mode, saved on a predetermined location in a memory of the control device, to operational mode. Setting the vehicle into an operational mode may comprise changing the status of a vehicle mode, saved on a predetermined location in a memory of each control unit of each module of the vehicle, to operational mode. In this way, when the control center requests vehicle mode status, it is informed that the vehicle is ready for operation. Alternatively or additionally, setting the vehicle into a maintenance mode may comprise setting a software mark (flag) of the control device to indicate a maintenance mode. Thus, setting the vehicle into a maintenance mode may comprise setting a software mark (flag) of the control units of the vehicle modules to indicate a maintenance mode. As an example, the flag may be set to 1 when the vehicle is in an operational mode and the flag may be set to 0 when the vehicle is in a maintenance mode. It is to be understood that other flags may be used to indicate different modes of the vehicle. By checking the flag of the vehicle modules, the control center will know if the vehicle is ready to perform a mission or not.

According to an example, preparing the vehicle for physical disconnection of the first module comprises controlling the modules, such that the load of the at least one functional module is not supported by the at least one drive module. When the load of the at least one functional module no longer is supported by the at least one drive module, the at least one drive module and the at least one functional module can be physically separated from each other. In order to remove the load of the at least one functional module from the at least one drive module the at least one functional module may be controlled to extend at least one support leg, such that the load of the at least one functional module is supported by the at least one support leg. The at least one functional module is thereby standing on the ground and physical disconnection is possible. Alternatively or additionally, the suspension of the at least one drive module is controlled, such that the vehicle is lowered, whereby the at least one functional module is lowered and rests on the ground. Irrespective of whether the at least one functional module should be replaced or whether the at least one drive module should be replaced, it is ensured that the at least one drive module does not carry the load of the at least one functional module. This may, however, only be relevant when the at least one functional module constitutes the first module and is about to be replaced or when the at least one functional module is physically connected to the first module. According to an example, the vehicle comprises a first drive module and a second drive module, where the first drive module is physically connected to the at least one functional module and the second drive module is physically connected to the first drive module. If the second drive module should be replaced and thus constitutes the first module, it may not be necessary to remove the load of the at least one functional module from the first drive module.

Preparing the vehicle for physical disconnection of the first module may comprise deleting the unique vehicle identity of the vehicle from the first module. The unique vehicle identity may be generated by the control center when a vehicle has been assembled, and it may be transmitted to, and be saved in, a control unit in each module of the assembled vehicle. The unique vehicle identity may be a number, a combination of letters and/or numbers, or a specific word. A module having a unique vehicle identity saved in a memory form part of a vehicle and the control center may thereby be informed that the module is no longer available in the set of modules for assembly of another vehicle. Also, by assigning the modules of the vehicle the unique vehicle identity the control center and/or the module operating as a master can, during operation of the vehicle, determine that correct modules are comprised in the operating vehicle. If the first module should keep its unique vehicle identity when it is replaced, it would be difficult for the control center to know which modules are actually part of the operating vehicle. Thus, a module no longer part of a vehicle should not comprise any unique vehicle identity. The unique vehicle identity is typically saved on a predetermined location in a memory of a control unit in each module of the vehicle. The predetermined location in the memory is a location dedicated for the unique vehicle identity. Deleting the unique vehicle identity of the vehicle from the first module may thus comprise deleting the unique vehicle identity from a predetermined location in a memory of the control unit in the first module. The control device may ensure that the unique vehicle identity is deleted by commanding a control unit of the first module to delete the unique vehicle identity. The unique vehicle identity of the vehicle remains the same even if a module is replaced. The unique vehicle identity thus remains the same until the vehicle is disassembled. The unique vehicle identity may be used in the communication between the control center and the modules of the vehicle. By deleting the unique vehicle identity from the first module the link between the first module and the rest of the vehicle is removed and the first module is thereby prepared to be removed from the vehicle. The control center communicating with the first module may in this way, be informed that the first module is available for use in another vehicle, when the reason for replacement has been rectified.

According to an example, preparing the vehicle for physical disconnection of the first module comprises saving operational data of the first module in the first module. The control device may ensure that operational data of the first module is saved locally in the first module. The control device may ensure that operational data is saved locally in the first module by commanding a control unit of the first module to save operational data. Such operational data may comprise a state of charge of an energy storage unit of the first module, error codes activated during operation of the first module, the total travelled distance, the travelled distance during the latest mission, maximum/minimum temperature in the first module during the latest mission, maximum acceleration/retardation/vibration during the latest mission, detected communication problems with other modules or information about the status of the energy storage unit. Saving operational data locally in the first module facilitates the process of identifying the possible error in the first module when the first module has been removed from the vehicle. For example, unusual events, such as sudden high acceleration and abnormal discharge of the energy storage unit may help identifying the error. Preparing the vehicle for physical disconnection of the first module may also comprise transmitting operational data of the first module to the control center arranged in communication with the vehicle. Saving the operational data of the first module centrally in the control center is an extra safety measure. However, the local workshop repairing the first module may not be connected to the control center and therefore it is crucial that the operational data is available locally in the first module. Saving the operational data, either in the first module and/or in the control center, also means that the operational data can be communicated to the new module. In this way, the new module can receive useful information about how the first module was operating during the current mission, which may help the new module when being part of the vehicle.

Preparing the vehicle for physical disconnection of the first module may additionally or alternatively comprise electrically disconnecting the first module from the vehicle. According to an example, electrically disconnecting the first module from the vehicle comprises inactivating communication means in the first module. The modules of the vehicle are suitably electrically connected via corresponding electrical interfaces. The communication means of the first module may be comprised in the electrical interface of the first module. Such an electrical interface may be configured to transfer electric energy and/or to transmit and/or receive electric signals. The electrical interface may be a wireless interface and/or a conductive interface. The communication means in the first module is thus means for transferring electric energy and/or transmitting/receiving electric signals to/from other modules of the vehicle. The communication means may comprise an internal communication network, such as CAN J1939, Flexray, Ethernet, fiber or similar. The communication means may alternatively or additionally comprise a transmitter and/or a receiver for wireless communication. The communication means may be inactivated by means of controlling a switch, a contactor or similar. In addition to the communication means for communicating with another module, the first module also comprises wireless communication means for communicating with the control center.

Establishing an electrical connection between the new module and the vehicle may thus comprise activating communication means in the new module. In this way, communication with other modules of the vehicle is enabled. Communication means of the module(s) being physically connected with the new module may also be activated. Establishing an electrical connection between the new module and the vehicle may also comprise exchanging information about the new module and the module(s) physically connected with the new module. Such information may be necessary for the operation of the assembled vehicle. In addition, via the exchange of information, the modules may be able to determine if the new module is a correct module to be electrically connected with. Establishing electrical connection between the new module and the vehicle may be performed in response to receiving an instruction for electrical connection from the control center. Alternatively, establishing electrical connection may be performed in response to detecting that the physical connection between the new module and the vehicle has been established. Thus, the method may comprise receiving an instruction for establishing electrical connection from the control center, or it may comprise detecting that a physical connection between the new module and the vehicle has been established. The physical connection between the new module and the vehicle may be detected by means of signals from at least one sensor device. The at least one sensor device may be arranged at the new module and/or at a module of the vehicle. The at least one sensor device may be configured to sense when the new module and the vehicle have been correctly connected physically. The control device may be arranged in communication with the at least one sensor device and may thereby receive a signal from the sensor device indicating that the physical connection was successfully performed.

When the new module has been electrically connected to the vehicle, it is assigned the unique vehicle identity. Assigning the new module the unique vehicle identity may comprise transmitting the unique vehicle identity to a control unit of the new module with instructions to save the unique vehicle identity on a predetermined location in a memory of the control unit. In this way, the new module is linked to the vehicle and the new module will thereby know that it belongs to the vehicle. Furthermore, the control center may, by requesting the unique vehicle identity from the new module, learn that the new module forms part of the assembled vehicle and thus no longer is available for assembly of another vehicle. The control center knows how many modules and which types of modules a vehicle is assembled from. A certain assembled vehicle with a certain unique vehicle identity should typically comprise the same number and same types of modules during its operation. If a module is removed or if a module is added, the vehicle may become a new type of vehicle and should be assigned a new unique vehicle identity. If a module is replaced during operation of the vehicle, the new module (of the same type) must be assigned the unique vehicle identity or the control center may determine that the vehicle has been modified, such that a new unique vehicle identity should be generated. The vehicle is thereafter set into an operational mode, indicating that the vehicle once again is ready for operation. Verifying the electrical connection of the new module may comprise transmitting a verification to the control center arranged in communication with the vehicle. In this way, the control center is informed that the vehicle is electrically configured and that it is ready to perform the mission/function it was performing before the replacement of the first module. The verification may be useful for the control center to be able to, for example, plan transport missions within a vehicle fleet. Verifying the electrical connection of the new module may alternatively or additionally comprise transmitting a verification to a module of the vehicle operating as master.

According to an example, the method further comprises instructing the new module to operate as a master or as a slave. In the event that the vehicle comprises two or more drive modules, it is convenient to appoint one drive module to operate as a master and the rest of the drive modules and the at least one functional module to operate as slaves. The master will decide how to operate the drive modules and thus how to operate the assembled vehicle. It is thus important that all modules of the vehicle can communicate with each other in order for the master to be able to operate the vehicle in an optimal way. The control device according to the present disclosure may thus instruct the new module to operate as a master or as a slave. Suitably, a control unit of the new module is instructed to operate the new module as a master or as a slave. If the new module replaces a module, which was operated as a slave, the new module will be instructed to be operated as a slave as well. In this case, the module being operated as a master may instruct the new module to operate as a slave. The control device may thus be comprised in the module being operated as a master. The module operated as master may have been appointed master by the control center. The control center may appoint a certain module to operate as a master for example based on the state of charge of the energy storage unit and/or the main travel direction of the assembled vehicle. According to another example, the assembled vehicle itself determines which module of the vehicle to operate as a master and which module(s) to operate as slave(s). In the event that the first module is operated as a master, another module of the vehicle will be appointed to operate as a temporary master while replacing the first module. When the new module has been physically and electrically connected to the vehicle, it may be instructed to operate as a master and the temporary master will then go back to operate as a slave.

The present disclosure also relates to a control device of a vehicle assembled from a set of modules. The control device is configured for replacing a first module of the vehicle with a new module. The vehicle comprises at least one drive module; and at least one functional module, wherein the at least one drive module comprises a pair of wheels and is configured to be autonomously operated and drive the assembled vehicle. The vehicle further comprises a unique vehicle identity. The control device is configured to: set the vehicle into a maintenance mode indicating that the vehicle is not available for operation; and prepare the vehicle for physical disconnection of the first module. When the first module has been physically disconnected from the vehicle and the new module has been physically connected to the vehicle, the control device is further configured to establish an electrical connection between the new module and the vehicle; assigning the new module the unique vehicle identity of the vehicle; set the vehicle into an operational mode; and verify the electrical connection of the new module.

It will be appreciated that all the embodiments described for the method aspect of the invention performed by the control device are also applicable to the control device aspect of the invention. That is, the control device may be configured to perform any one of the steps of the method according to the various embodiments described above.

The control device may be configured to control the operation of the first module. In the event that the first module is a drive module, the control device may thus be configured to transmit control signals to the various systems and components of the first module for controlling, for example, the steering and the propulsion of the first module. The control device may thereby be adapted to operate the first module autonomously based on received commands, e.g. from the control center, and based on sensor input regarding its surroundings and positioning. The control device is in that case adapted to receive commands from a remotely located control center and to convert the command into control signals for controlling the various systems and components of the first module. The control device may be configured to receive data about the surroundings from various sensor devices, and based on this data, control the first module. The control device may also be adapted to communicate with traffic systems of various kinds. The control device may thereby be able to determine the status of a traffic light, determine if an accident has occurred and based on that determine a new route for the vehicle, or itself if not connected to a functional module, etc. The control device may be adapted to communicate directly with such traffic systems or it may be adapted to communicate with such traffic systems via the control center.

The present disclosure also relates to a computer program comprising instructions which, when the program is executed by a computer, causes the computer to carry out the method disclosed above. The present disclosure further relates to a non-volatile computer-readable medium comprising instructions, which when executed by a computer, causes the computer to carry out the method disclosed above.

According to an aspect of the present disclosure, a vehicle assembled from a set of modules is provided. The vehicle comprises at least one drive module and at least one functional module. The at least one drive module may comprise a pair of wheels and may be configured to be autonomously operated and drive the assembled vehicle. The vehicle further comprises a control device as disclosed herein.

Furthermore, the present disclosure relates to a system, configured for replacing a module of a vehicle with a new module. The vehicle is assembled from a set of modules and comprises at least one drive module and at least one functional module, wherein the at least one drive module comprises a pair of wheels and is configured to be autonomously operated and drive the assembled vehicle. The system comprises a control center arranged in communication with the assembled vehicle and a control device as disclosed herein.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which.

DETAILED DESCRIPTION

The present disclosure will now be further illustrated with reference to the appended figures.

The term "link" refers herein to a communication link, which may be a physical connection such as an opto-electronic communication line, or a non-physical connection such as a wireless connection, e.g. a radio link or microwave link.

It is to be understood that where connection/disconnection of the new module, respectively, the first module, is mentioned in relation to the vehicle, is meant connection/disconnection of the new module, respectively the first module, in relation to another module of the vehicle.

Figure 1:
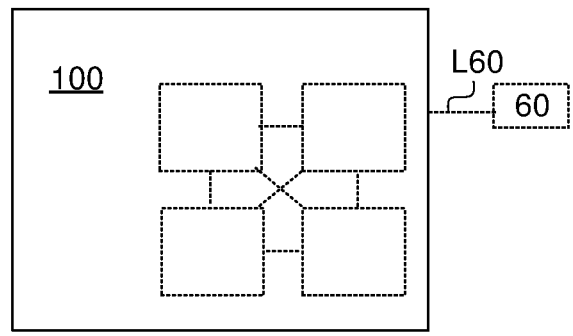
FIG. 1 schematically illustrates a control device according to an example.

FIG. 1 schematically illustrates a control device 100 of a vehicle assembled from a set of modules according to an example. The control device 100 is configured for replacing a first module of the vehicle with a new module from the set of modules. The vehicle comprises at least one drive module and at least one functional module, wherein the at least one drive module comprises a pair of wheels and is configured to be autonomously operated and drive the assembled vehicle. The vehicle further comprises a unique vehicle identity. The first module may be a drive module or a functional module. The new module is the similar type of module as the first module. The vehicle, the set of modules, the at least one drive module, the at least one functional modules and thus the first module and the new module are disclosed in FIG. 3. The control device 100 is comprised in the vehicle.

The control device 100 may be implemented as a separate entity or may comprise a plurality of entities, such as control units or computers, as illustrated by the dashed boxes in the Figure. The entities may be distributed in different modules of the vehicle or the whole control device may be comprised in one module of the vehicle. The control device 100 may, at least partly, be comprised in a module of the vehicle being operated as a master. The control device 100 may be configured to communicate with a control center as disclosed in FIG. 2.

The control device 100 is configured to: set the vehicle into a maintenance mode indicating that the vehicle is not available for operation; and prepare the vehicle for physical disconnection of the first module. The control device 100 is further configured so that when the first module has been physically disconnected from the vehicle and the new module has been physically connected with the vehicle, then establish an electrical connection between the new module and the vehicle; assign the new module the unique vehicle identity of the vehicle; set the vehicle into an operational mode; and verify the electrical connection of the new module.

The control device 100 may be configured to set the vehicle into a maintenance mode based on a received command from a control center arranged in communication with the vehicle. Alternatively, the control device 100 is configured to set the vehicle into a maintenance mode based on a command from an operator, received via an operator interface on the vehicle or via a smart device. The control device 100 may be configured to set the vehicle into a maintenance mode by setting one or more modules of the vehicle into a maintenance mode. The control device 100 may be configured to set the vehicle into a maintenance mode by changing a vehicle mode status, saved on a predetermined location in a memory of the control device 100, to maintenance mode. The control device 100 may be configured to set the vehicle into a maintenance mode by setting a software mark (flag) of the control device to indicate a maintenance mode. As an example, the control device 100 may configured to set the flag to 1 when the vehicle 1 is in an operational mode and to set the flag to 0 when the vehicle 1 is in a maintenance mode.

According to an example, the control device 100 is configured to prepare the vehicle for physical disconnection of the first module by controlling the modules, such that the at least one drive module does not support the load of the at least one functional module. The control device 100 may be configured to control the at least one functional module to extend at least one support leg, such that the load of the at least one functional module is supported by the at least one support leg. Additionally or alternatively, the control device 100 is configured to control the at least one drive module, such that the vehicle is lowered and the at least one functional module is resting on the ground. In this way, the at least one drive module will not carry any load of the at least one functional module. Typically, the control device 100 is configured to control the suspension of the at least one drive module, such that the vehicle is lowered towards the ground on which it is standing.

The control device 100 may further be configured to prepare the vehicle for physical disconnection of the first module by deleting a unique vehicle identity of the vehicle from the first module. The control device 100 may be configured to delete the unique vehicle identity of the vehicle from the first module, by commanding a control unit of the first module to delete the unique vehicle identity from a predetermined location in a memory of the control unit. The control device 100 may be configured to prepare the vehicle for physical disconnection of the first module by saving operational data of the first module in the first module. In the event that the control device 100 is at least partly comprised in the first module, the control device 100 may be configured to save operational data of the first module. In the event that the control device 100 is at least partly comprised in a module operating as a master, the control device 100 may be configured to ensure that operational data of the first module is saved in the first module by commanding a control unit of the first module to save operational data of the first module.

According to yet another example, the control device 100 is configured to prepare the vehicle for physical disconnection of the first module by electrically disconnecting the first module from the vehicle. The control device 100 may be configured to electrically disconnect the first module from the vehicle by inactivating communication means in the first module. The control device 100 may alternatively be configured to electrically disconnect the first module from the vehicle by commanding a control unit of the first module to inactivate communication means in the first module.

The control device 100 may be configured to establish an electrical connection between the new module and the vehicle by activating the communication means in the new module. The control device 100 may alternatively be configured to establish an electrical connection between the new module and the vehicle by commanding a control unit of the new module to activate communication means in the new module. The control device 100 may be configured to establish electrical connection between the new module and the vehicle as a response to any one of: receiving an instruction for the activation from the control center, or detecting that the physical connection between the new module and the vehicle has been established. The control device 100 may be arranged in communication with at least one sensor device 60 arranged on the new module and/or on the module of the vehicle physically connected with the new module (and previously physically connected with the first module). The control device 100 is arranged to communicate with the at least one sensor device 60 via a link L60. The control device 100 may thus be configured to receive a signal from the at least one sensor device 60 indicating that the physical connection has been correctly performed, and based on this, activate the communication means in the new module.

The control device 100 may be configured to instruct the new module to operate as a master or as a slave. Suitably, the control device 100 instructs the new module to operate as master or slave depending on how the first module was operating. Thus, if the first module was operating as a master, the new module will be instructed to operate as a master, and if the first module was operating as a slave, the new module will be instructed to operate as a slave.

According to an example, the control device 100 is configured to verify the electrical connection of the new module by transmitting a verification to a control center arranged in communication with the vehicle.

Figure 2:
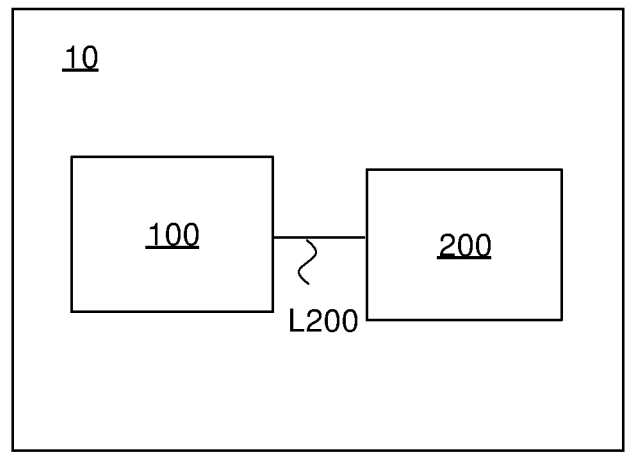
FIG. 2 schematically illustrates a system according to example.

FIG. 2 schematically illustrates a system 10, configured for replacing a first module of a vehicle with a new module. The system 10 comprises a control center 200 and a control device 100. The control device 100 is configured as the control device 100 as disclosed in FIG. 1. The control device 100 is comprised in the vehicle. The control device 100 may be, at least partly, comprised in the first module of the vehicle. The control device 100 is arranged in communication with the control center 200 via a respective link L200. The control center 200 may be referred to as an off-board system. The control center 200 may be implemented as a separate entity or distributed in two or more physical entities. The control center 200 may comprise one or more computers.

Figure 3:
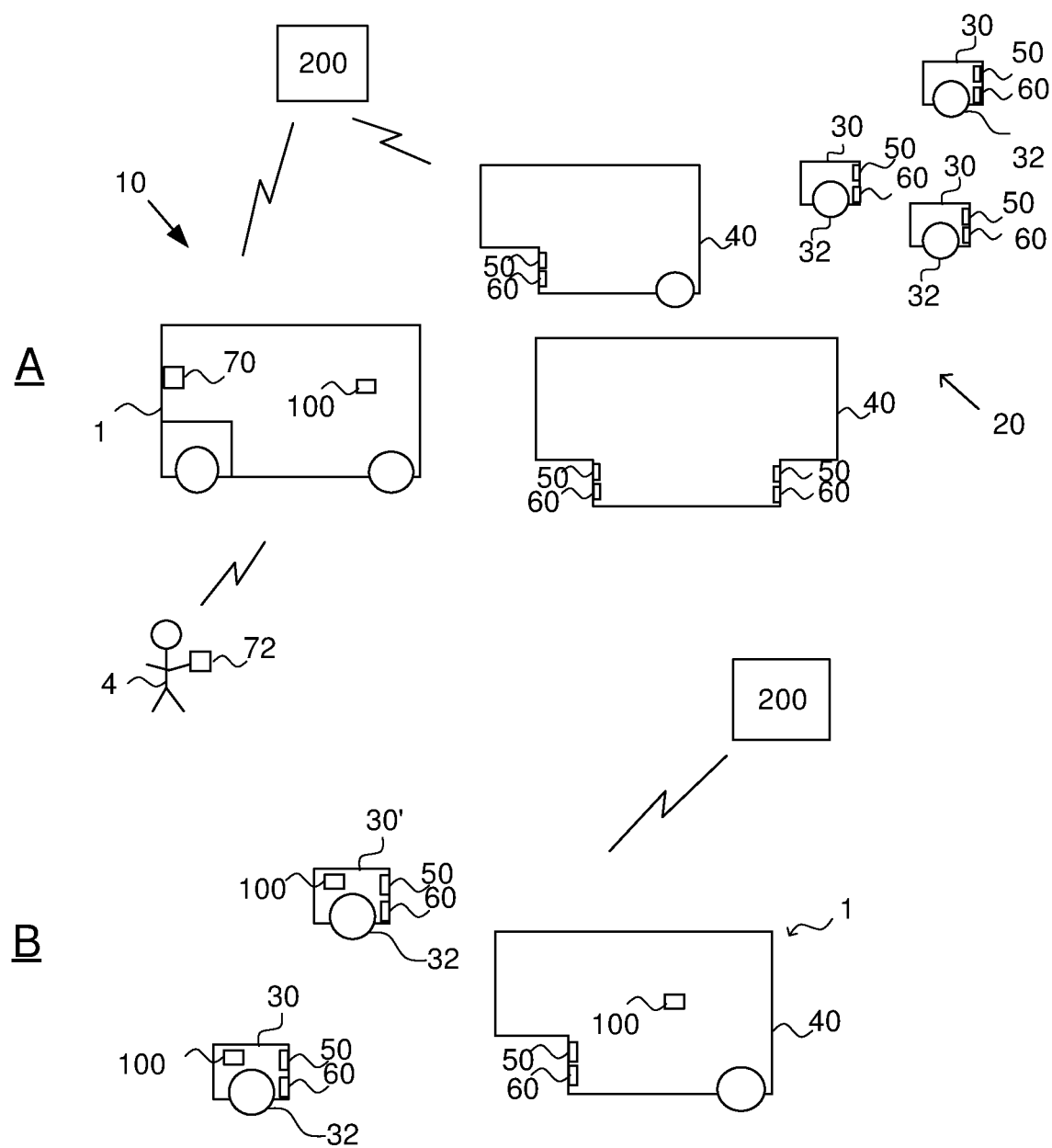
FIG. 3 schematically illustrates application of a system according to an example.

FIG. 3 schematically shows an example of an application of a system 10 as disclosed in FIG. 2. Thus, FIG. 3 illustrates a context in which the system 10 may be used. The Figure illustrates a vehicle 1 assembled from a set of modules 20 in a scenario A. The vehicle 1 comprises a control device 100 as disclosed in FIG. 1 and can thus communicate with a control center 200 as disclosed in FIG. 2. The set of modules 20 comprises a plurality of drive modules 30 and a plurality of functional modules 40, wherein each drive module 30 comprises a pair of wheels 32 and is configured to be autonomously operated. Each module 30, 40 in the set of modules 20 comprise at least one interface releasably connectable to a corresponding interface on another module 30, 40. The modules 30, 40 suitably comprise at least one physical interface and at least one electrical interface. By combining drive modules 30 and functional modules 40, different types of vehicles 1 can be achieved. Some vehicles 1 require two drive modules 30 and some vehicles 1 only require one drive module 30, depending on the structural configuration of the functional module 40. Each drive module 30 may comprise a plurality of interfaces for releasable connection with other modules 30, 40. The interface(s) of the drive modules 30 may be arranged on different sides of the drive module 30 and thus enable connection with other modules 30, 40 on multiple sides of the drive module 30. The interfaces on the drive modules 30 and the functional modules 40 respectively, are suitably arranged on corresponding positions to enable connection between the modules 30, 40. Each module 30, 40 comprises communication means 50 for communication with another module 30, 40. The communication means 50 may form part of the at least one interface of each module 30, 40. The communication means 50 of each module 30, 40 are controlled by the control devices 100 of the module 30, 40. The communication means 50 may comprise an internal communication network, such as CAN J1939, Flexray, Ethernet, fiber or similar. The communication means 50 may additionally or alternatively comprise a transmitter and a receiver for wireless communication between the modules 30, 40. The communication means 50 may be activated by means of controlling a switch, a contactor or similar. Each module 30, 40 may also comprise at least one sensor device 60 configured to sense when physical connection between two modules has been performed.

Scenario B of FIG. 3 illustrates a scenario where an operator 4 has identified that a first module 30 of the vehicle 1 should be replaced with a new module 30' from the set of modules 20. In this example, the first module 30 and the new module 30' are drive modules 30 but it is to be understood that the first module, and thus the new module, may be functional modules 40. In this example, the control device 100 comprises a plurality of entities distributed in the first module 30, the functional module 40 and the new modules 30'. It is to be understood that the replacement of the first module 30 alternatively can be identified by the control device 100 and/or the control center 200. The reason for replacing the first module 30 may for example be malfunction, need of service or low state of charge. How replacement of a module 30, 40 is identified is not part of this application per se and will therefore not be further described. The need for replacement may be urgent and the replacement may thereby take place along the roadside or the need for replacement is not urgent and the replacement may thereby take place in a workshop or similar. The new module 30' may be autonomously operated to the location of the vehicle 1, or the new module 30' may be transported to the location of the vehicle 1 by means of another vehicle. In this example, the need for replacement has been identified by an operator 4 during service of the assembled vehicle 1. The operator 4 may then by means of an operator interface 70 on the vehicle 1, or via a smart device 72, command the vehicle 1 to perform the replacement of the first module 30. The operator interface 70 and the smart device 72 are thus configured to communicate with the control device 100 of the vehicle 1. The operator interface 70 may be a button, lever, switch or a display on the vehicle 1. The smart device 72 may be a smartphone, tablet, smartwatch, smart band, smart key chain or similar. The control device 100 of the vehicle 1 then performs the method as disclosed in FIG. 4*a-b*. Thus, the vehicle 1 is set into a maintenance mode and the control center 200 is thereby informed that the vehicle 1 no longer is available for operation. The vehicle 1 is subsequently prepared for physical disconnection of the first module 30, where after the first module 30 is physically disconnected and replaced with the new module 30'. The physical disconnection of the first module 30 may be performed manually by the operator 4 and the physical connection of the new module 30' may be performed manually by the operator. When the new module 30' has been physically connected to the remaining modules of the vehicle 1 an electrical connection is established between the new module 30' and the vehicle 1. In this way, communication and/or power transfer between the new module 30' and the other modules of the vehicle 1 is enabled. The new module 30' is also assigned the unique vehicle identity whereby the new module 30' is linked/connected to the vehicle 1. The new module 30' is thereby no longer available for assembly of another vehicle. Finally, the vehicle 1 is set into an operational mode such that it can continue its mission/task and the electrical connection of the new module 30' is verified. By verifying the electrical connection of the new module 30', it can be ensured that the electrical connection has been correctly performed.

Figure 4A:
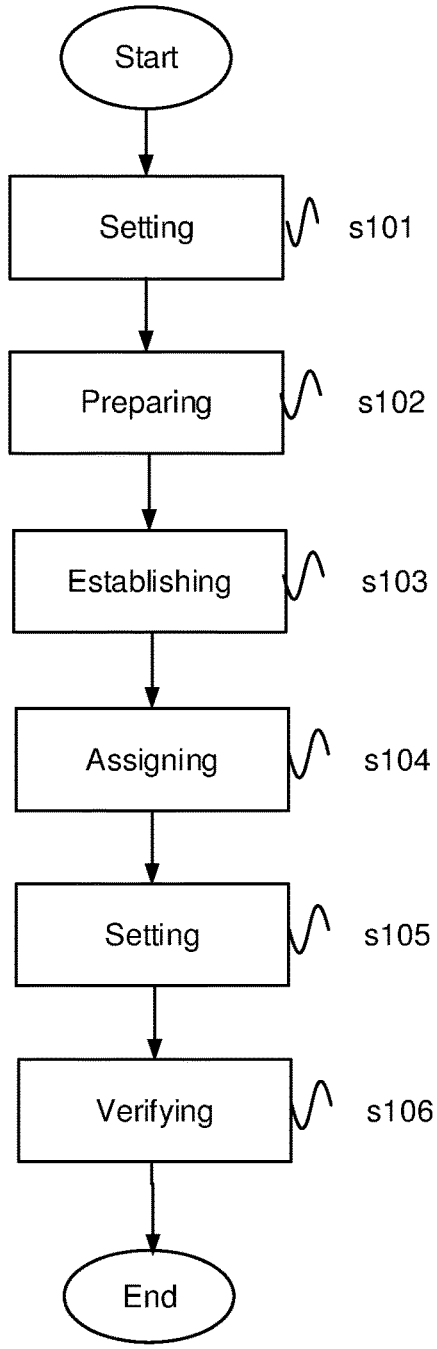
FIG. 4a-b illustrates flow charts for a method for replacing a module of a vehicle according to an example.

FIG. 4a illustrates a flow chart for a method, performed by a control device of a vehicle assembled from a set of modules, for replacing a first module of the vehicle with a new module from the set of modules. The method thus relates to the control device 100 as disclosed in FIG. 1, the vehicle 1 as disclosed in FIG. 2 and the set of modules 20 as disclosed in FIG. 3. The vehicle 1 comprises at least one drive module 30 and at least one functional module 40, wherein the at least one drive module 30 comprises a pair of wheels 32 and is configured to be autonomously operated and drive the assembled vehicle 1. The vehicle 1 further comprises a unique vehicle identity. The method comprises: setting s101 the vehicle 1 into a maintenance mode indicating that the vehicle 1 is not available for operation; and preparing s102 the vehicle 1 for physical disconnection of the first module 30, 40. The method further comprises, when the first module 30, 40 has been physically disconnected from the vehicle 1 and the new module 30, 30', 40 has been physically connected to the vehicle 1: establishing s103 an electrical connection between the new module 30, 30', 40 and the vehicle 1; assigning s104 the new module 30, 30', 40 the unique vehicle identity of the vehicle 1; setting s105 the vehicle 1 into an operational mode; and verifying s106 the electrical connection of the new module 30, 30', 40.

The first module 30, 40 may be a drive module 30 or a functional module 40 and the new module 30, 30', 40 may be a drive module 30, 30' ora functional module 40.

The step of setting s101 the vehicle 1 into the maintenance mode may be based on a received command from the control center 200 arranged in communication with the vehicle 1. The control center 200 may be configured to determine when a module of the vehicle 1, for some reason, should be replaced with a new similar module. The control center 200 may transmit a command to the control device 100 of the vehicle 1, to initiate replacement of a first module 30, 40. The control device 100 may thereby receive a command from the control center 200 to replace a certain module 30, 40 and thus to set the vehicle 1 into a maintenance mode.

Alternatively, the step of setting s101 the vehicle 1 into the maintenance mode may be performed when the control device 100 has identified that the first module 30, 40 should be replaced with a new module 30, 30', 40. According to another example, the step of setting s101 the vehicle 1 into the maintenance mode is based on a command from an operator 4, received via an operator interface 70 on the vehicle 1 or via a smart device 72.

Setting s101 the vehicle 1 into a maintenance mode may involve setting some or all modules 30, 40 of the vehicle 1 into a maintenance mode. Setting s101 the vehicle 1 into a maintenance mode may comprise changing the status of a vehicle mode, saved on a predetermined location in the memory of the control device 100, to maintenance mode. Setting s101 the vehicle 1 into a maintenance mode may comprise changing the status of a vehicle mode, saved on a predetermined location in a memory of each control unit of each module 30, 40 of the vehicle 1, to maintenance mode. Alternatively or additionally, setting s101 the vehicle 1 into a maintenance mode may comprise setting a software mark (flag) of the control device 100 to indicate a maintenance mode. Thus, setting s101 the vehicle 1 into a maintenance mode may comprise setting a software mark (flag) of the control units of the vehicle modules 30, 40 to indicate a maintenance mode. As an example, the flag may be set to 1 when the vehicle 1 is in an operational mode and the flag may be set to 0 when the vehicle 1 is in a maintenance mode.

The step of preparing s102 the vehicle 1 for physical disconnection of the first module 30, 40 may comprise controlling the modules 30, 40, such that the at least one drive module 30 is not supporting the load of the at least one functional module 40. Preparing s102 the vehicle 1 for physical disconnection of the first module 30, 40 may thus comprise controlling the at least one functional module 40 to extend at least one support leg (not shown), such that the load of the at least one functional module 40 is supported by the at least one support leg. Alternatively or additionally, preparing s102 the vehicle 1 for physical disconnection of the first module 30, 40 comprises controlling the suspension of the at least one drive module 30, such that the vehicle 1 is lowered, whereby the at least one functional module 40 is lowered and rests on the ground.

Preparing s102 the vehicle 1 for physical disconnection of the first module 30, 40 may also comprise deleting the unique vehicle identity of the vehicle 1 from the first module 30, 40. Deleting the unique vehicle identity of the vehicle 1 from the first module 30, 40 may comprise deleting the unique vehicle identity from a predetermined location in a memory of the control unit in the first module 30, 40. The control device 100 may ensure that the unique vehicle identity is deleted by commanding a control unit of the first module 30, 40 to delete the unique vehicle identity.

According to an example, preparing s102 the vehicle 1 for physical disconnection of the first module 30, 40 comprises saving operational data of the first module 30, 40 in the first module 30, 40. The control device 100 may ensure that operational data of the first module 30, 40 is saved locally in the first module 30, 40. The control device 100 may ensure that operational data is saved locally in the first module 30, 40 by commanding a control unit of the first module 30, 40 to save operational data.

Preparing s102 the vehicle 1 for physical disconnection of the first module 30, 40 may additionally or alternatively comprise electrically disconnecting the first module 30, 40 from the vehicle 1. According to an example, electrically disconnecting the first module 30, 40 from the vehicle 1 comprises inactivating communication means 50 in the first module 30, 40. The communication means 50 may comprise an internal communication network, such as CAN J1939, Flexray, Ethernet, fiber or similar. The communication means 50 may alternatively or additionally comprise a transmitter and/or a receiver for wireless communication. The communication means 50 may be inactivated by means of controlling a switch, a contactor or similar.

The step of establishing s103 an electrical connection between the new module 30, 30', 40 and the vehicle 1 may comprise activating communication means 50 in the new module 30, 30', 40. Establishing s103 an electrical connection between the new module 30, 30', 40 and the vehicle 1 may also comprise exchanging information about the new module 30, 30', 40 and the module(s) 30, 40 physically connected with the new module 30, 30', 40. Establishing s103 electrical connection between the new module 30, 30', 40 and the vehicle 1 may be performed in response to receiving an instruction for electrical connection from the control center 200. Alternatively, establishing s103 electrical connection may be performed in response to detecting that the physical connection between the new module 30, 30', 40 and the vehicle 1 has been established. Thus, the method may comprise receiving an instruction for establishing electrical connection from the control center 200, or it may comprise detecting that a physical connection between the new module 30, 30', 40 and the vehicle 1 has been established. The physical connection between the new module 30, 30', 40 and the vehicle 1 may be detected by means of signals from at least one sensor device 60 arranged at the new module 30, 30', 40 and/or at a module of the vehicle 1.

The step of setting s104 the vehicle 1 into an operational mode may comprise changing the status of the vehicle mode, saved on a predetermined location in a memory of the control device 100, to operational mode. Setting s104 the vehicle 1 into an operational mode may comprise changing the status of a vehicle mode, saved on a predetermined location in a memory of each control unit of each module 30, 40 of the vehicle 1, to operational mode. Setting s104 the vehicle 1 into an operational mode may comprise setting a software mark (flag) of the control device 100 to indicate an operational mode. Thus, setting s104 the vehicle 1 into an operational mode may comprise setting a software mark (flag) of the control units of the vehicle modules 30, 40 to indicate a maintenance mode. As an example, the flag may be set to 1 when the vehicle 1 is in an operational mode.

Verifying s106 the electrical connection of the new module 30, 30', 40 may comprise transmitting a verification to the control center 200 arranged in communication with the vehicle 1. In this way, the control center is informed that the vehicle is electrically configured and that it is ready to perform the mission/function it was performing before the replacement of the first module. Verifying s106 the electrical connection of the new module 30, 30', 40 may alternatively or additionally comprise transmitting a verification to a module 30, 40 of the vehicle 1 operating as master.

Figure 4B:
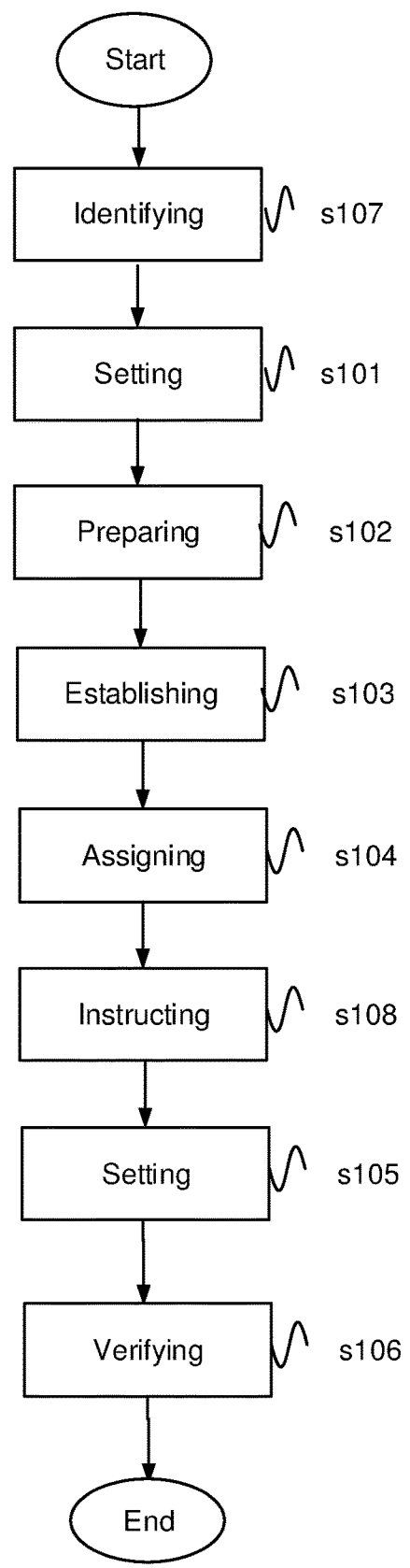

FIG. 4*b* illustrates a flow chart for a method, performed by a control device of a vehicle assembled from a set of modules, for replacing a first module of the vehicle with a new module from the set of modules. The method thus relates to the control device 100 as disclosed in FIG. 1, the vehicle 1 as disclosed in FIG. 2 and the set of modules 20 as disclosed in FIG. 3. The vehicle 1 comprises at least one drive module 30 and at least one functional module 40, wherein the at least one drive module 30 comprises a pair of wheels 32 and is configured to be autonomously operated and drive the assembled vehicle 1. The vehicle 1 further comprises a unique vehicle identity. The first module 30, 40 may be a drive module 30 or a functional module 40 and the new module 30, 30', 40 may be a drive module 30, 30' or a functional module 40.

The method comprises identifying s107 that a first module 30, 40 of the vehicle 1 should be replaced with a new module 30, 30', 40. The control device 100 may identify that a first module 30, 40 should be replaced based on information relating to the operation and general status of the first module 30, 40. Alternatively, the control device 100 may identify that a first module 30, 40 should be replaced based on a command from the control center 200 or based on a command from an operator 4, received via an operator interface 70 on the vehicle 1 or via a smart device 72.

The method further comprises the steps as disclosed in FIG. 4*a*.

In addition, the method comprises instructing s108 the new module 30, 30', 40 to operate as a master or as a slave. This is performed after establishing s103 electrical connection between the first module 30, 30', 40 and the vehicle 1 and before setting s105 the vehicle into operational mode. The master module 30, 40 will decide how to operate the slave modules 30, 40 and thus how to operate the assembled vehicle 1. The control device 100 may instruct s108 the new module 30, 30', 40 to operate as a master or as a slave. Suitably, a control unit of the new module 30, 30', 40 is instructed to operate the new module 30, 30', 40 as a master or as a slave. If the new module 30, 30', 40 replaces a first module 30, 40, which was operating as a slave, the new module 30, 30', 40 will be instructed to be operated as a slave as well. In the event that the first module 30, 40 is operating as a master, another module 30, 40 of the vehicle 1 will be appointed to operate as a temporary master while replacing the first module 30, 40 with the new module 30, 30', 40. When the new module 30, 30', 40 has been physically and electrically connected to the vehicle 1, it may be instructed to operate as a master and the temporary master will then go back to operate as a slave.

Figure 5:
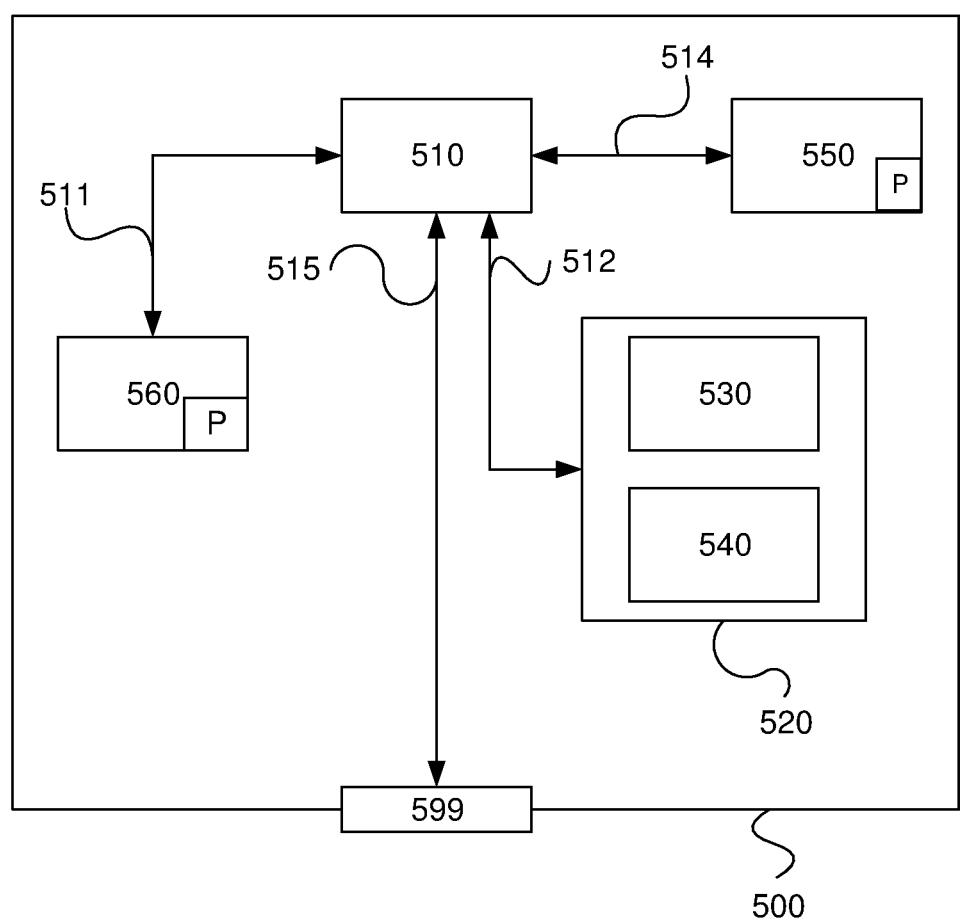
FIG. 5 schematically illustrates a control device or computer according to an example.

FIG. 5 is a diagram of a version of a device 500. The control device 100 described with reference to FIG. 1 and FIG. 2 may in a version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P which comprises routines for replacing a first module of a vehicle with a new module. The program P may be stored in an executable form or in a compressed form in a memory 560 and/or in a read/write memory 550.

Where the data processing unit 510 is described as performing a certain function, it means that the data processing unit 510 effects a certain part of the program stored in the memory 560 or a certain part of the program stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510, which runs the program stored in the memory 560 or the read/write memory 550. When the device 500 runs the program, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method, performed by a control device of a vehicle assembled from a set of modules, for replacing a first module of the vehicle with a new module from the set of modules, the vehicle comprising:
at least one drive module; and
at least one functional module;
wherein the at least one drive module comprises a pair of wheels and is configured to be autonomously operated and drive the assembled vehicle, the vehicle further comprising a unique vehicle identity, the method comprising:
setting the vehicle into a maintenance mode indicating that the vehicle is not available for operation; and
preparing the vehicle for physical disconnection of the first module;
the method further comprising, when the first module has been physically disconnected from the vehicle and the new module has been physically connected to the vehicle:
establishing an electrical connection between the new module and the vehicle;
after the establishing the electrical connection between the new module and the vehicle, assigning the new module the unique vehicle identity of the vehicle and thereby linking the new module to the vehicle;
setting the vehicle into an operational mode; and
verifying the electrical connection of the new module.

2. The method according to claim 1, wherein the vehicle is set into the maintenance mode based on a received command from a control center arranged in communication with the vehicle.

3. The method according to claim 1, wherein the vehicle is set into the maintenance mode based on a command from an operator, received via an operator interface on the vehicle or via a smart device.

4. The method according to claim 1, wherein preparing the vehicle for physical disconnection of the first module comprises controlling the modules, such that the at least one drive module is not supporting the load of the at least one functional module.

5. The method according to claim 4, wherein the at least one functional module is controlled to extend at least one support leg, such that the load of the at least one functional module is supported by the at least one support leg.

6. The method according to claim 1, wherein preparing the vehicle for physical disconnection of the first module comprises deleting the unique vehicle identity of the vehicle from the first module.

7. The method according to claim 1, wherein preparing the vehicle for physical disconnection of the first module comprises saving operational data of the first module in the first module.

8. The method according to claim 1, wherein preparing the vehicle for physical disconnection of the first module comprises electrically disconnecting the first module from the vehicle.

9. The method according to claim 1, further comprising:
instructing the new module to operate as a master or as a slave.

10. The method according to claim 1, wherein setting the vehicle into a maintenance mode involves setting some or all modules of the vehicle into a maintenance mode.

11. The method according to claim 1, wherein verifying the electrical connection of the new module comprises transmitting a verification to a control center arranged in communication with the vehicle.

12. A computer program product comprising a non-transitory computer-readable medium containing a program of instructions which, when the program is executed by a computer, cause the computer to carry out the method according to claim 1.

13. A non-transitory computer-readable medium comprising instructions, which when executed by a computer, cause the computer to carry out the method according to claim 1.

14. A control device of a vehicle assembled from a set of modules, the control device being configured for replacing a first module of the vehicle with a new module from the set of modules, the vehicle comprising:
at least one drive module; and
at least one functional module;
wherein the at least one drive module comprises a pair of wheels and is configured to be autonomously operated and drive the assembled vehicle, wherein the vehicle further comprises a unique vehicle identity, the control device being configured to:
set the vehicle into a maintenance mode indicating that the vehicle is not available for operation; and
prepare the vehicle for physical disconnection of the first module;
wherein the control device is configured to prepare the vehicle for physical disconnection of the first module by electrically disconnecting the first module from the vehicle;
wherein the control device is further configured to, when the first module has been physically disconnected from the vehicle and the new module has been physically connected with the vehicle:
establish an electrical connection between the new module and the vehicle;
after the establishing the electrical connection between the new module and the vehicle, assign the new module the unique vehicle identity of the vehicle and thereby link the new module to the vehicle;
set the vehicle into an operational mode; and
verify the electrical connection of the new module.

15. The control device according to claim 14, wherein the control device is configured to set the vehicle into a maintenance mode based on a received command from a control center arranged in communication with the vehicle.

16. The control device according to claim 14, wherein the control device is configured to set the vehicle into a maintenance mode based on a command from an operator, received via an operator interface on the vehicle or via a smart device.

17. The control device according to claim 14, wherein the control device is configured to prepare the vehicle for physical disconnection of the first module by controlling the modules, such that the at least one drive module does not support the load of the at least one functional module.

18. The control device according to claim 17, wherein the control device is configured to control the at least one functional module to extend at least one support leg, such that the load of the at least one functional module is supported by the at least one support leg.

19. The control device according to claim 14, wherein the control device is configured to prepare the vehicle for physical disconnection of the first module by deleting the unique vehicle identity of the vehicle from the first module.

20. The control device according to claim 14, wherein the control device is configured to prepare the vehicle for physical disconnection of the first module by saving operational data of the first module locally in the first module.

21. The control device according to claim 14, further being configured to instruct the new module to operate as a master or as a slave.

22. The control device according to claim 14, wherein the control device is configured to set the vehicle into a maintenance mode by setting some or all modules of the vehicle into a maintenance mode.

23. The control device according to claim 14, wherein the control device is configured to verify the electrical connection of the new module by transmitting a verification to a control center arranged in communication with the vehicle.

24. A vehicle assembled from a set of modules, the vehicle comprising:
- at least one drive module; and
- at least one functional module;
- wherein the vehicle further comprises a control device according to claim 14.

25. A system, configured for replacing a first module of a vehicle assembled from a set of modules with a new module from the set of modules, the vehicle comprising at least one drive module and at least one functional module, wherein the at least one drive module comprises a pair of wheels and is configured to be autonomously operated and drive the assembled vehicle, wherein the vehicle further comprises a unique vehicle identity, the system comprising:
- a control center arranged in communication with the vehicle;
- wherein the system further comprises a control device according to claim 14.

* * * * *